United States Patent
Yoshida et al.

(10) Patent No.: US 7,164,439 B2
(45) Date of Patent: Jan. 16, 2007

(54) FLICKER CORRECTION APPARATUS AND FLICKER CORRECTION METHOD, AND RECORDING MEDIUM STORING FLICKER CORRECTION PROGRAM

(75) Inventors: Takuji Yoshida, Nara (JP); Katsuji Kimura, Yao (JP); Noboru Kubo, Ikoma (JP); Hiroyuki Okuhata, Osaka (JP); Toshiyuki Kaya, Toyooka (JP); Shinsuke Hamanaka, Shingu (JP); Eiji Ono, Kashihara (JP); Isao Shirakawa, Toyonaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 768 days.

(21) Appl. No.: 10/327,892

(22) Filed: Dec. 26, 2002

(65) Prior Publication Data

US 2003/0142239 A1    Jul. 31, 2003

(30) Foreign Application Priority Data

Dec. 27, 2001 (JP) ............................ 2001-398578

(51) Int. Cl.
*H04N 9/73* (2006.01)
*H04N 5/228* (2006.01)

(52) U.S. Cl. ................. 348/226.1; 348/910; 348/222.1

(58) Field of Classification Search ............ 348/226.1, 348/910, 425.2, 425.3
See application file for complete search history.

(56) References Cited

U.S. PATENT DOCUMENTS

| | | | | |
|---|---|---|---|---|
| 5,293,238 | A * | 3/1994 | Nakano et al. ............. | 348/910 |
| 6,501,518 | B1 * | 12/2002 | Smith et al. ............. | 348/425.3 |
| 6,657,659 | B1 * | 12/2003 | Van Rooy et al. ........ | 348/226.1 |
| 6,710,818 | B1 * | 3/2004 | Kasahara et al. ......... | 348/226.1 |
| 7,034,870 | B1 * | 4/2006 | Nagaoka et al. ......... | 348/226.1 |
| 2002/0158971 | A1 * | 10/2002 | Daiku et al. ............. | 348/226.1 |

FOREIGN PATENT DOCUMENTS

EP    1091571 A2    4/2001

(Continued)

OTHER PUBLICATIONS

Hurwitz, J. et al., "A Miniature Imaging Module for Mobile Applications," Solid-State circuits Conference, 2001, Digest of Technical Papers, ISSCC. 2001, IEEE International Feb. 5-7, 2001, Piscataway, NJ, USA, IEEE, Feb. 5, 2001. pp. 90-91, 436.

*Primary Examiner*—David Ometz
*Assistant Examiner*—Nhan T. Tran
(74) *Attorney, Agent, or Firm*—Birch, Stewart, Kolasch & Birch, LLP

(57) ABSTRACT

A flicker correction apparatus for correcting a flicker component of an image signal obtained by imaging an object using an imaging device is provided. The apparatus comprises an image average calculation section for calculating an average of the image signal, a flicker frequency calculation section for calculating a flicker frequency, a flicker data extraction section for extracting flicker data using the average of the image signal and the flicker frequency, a flicker determination section for determining the presence or absence of a flicker phenomenon using the flicker data, a flicker correction amount calculation section for calculating a flicker correction amount using the flicker data, and a flicker correction section for removing the flicker component of the image data using the flicker correction amount.

11 Claims, 9 Drawing Sheets

FOREIGN PATENT DOCUMENTS

| | | | |
|---|---|---|---|
| JP | 08-088794 | * | 4/1996 |
| JP | 11-122513 | * | 4/1999 |
| JP | 11-122513 A | | 4/1999 |
| JP | 11-252446 A | | 9/1999 |
| JP | 11-313226 A | | 11/1999 |
| JP | 2000-244822 | * | 9/2000 |

* cited by examiner

CONVENTIONAL ART

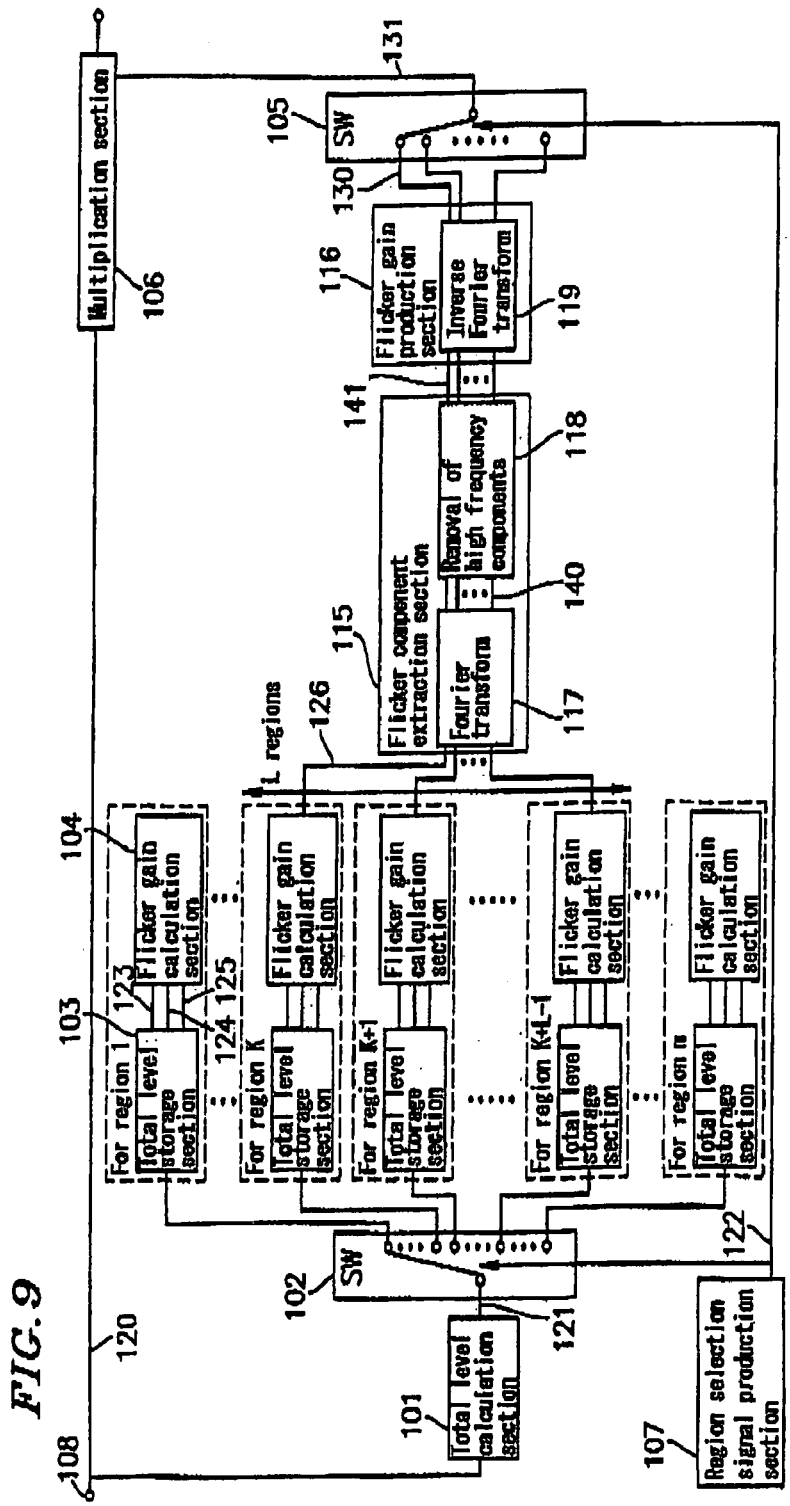

FLICKER CORRECTION APPARATUS AND FLICKER CORRECTION METHOD, AND RECORDING MEDIUM STORING FLICKER CORRECTION PROGRAM

BACKGROUND OF THE INVENTION

1. Field of the Invention

The present invention relates to a flicker correction apparatus, a flicker correction method, and a recording medium storing a flicker correction program for correcting a flicker component of an image signal obtained by imaging an object using an imaging device. More particularly, the present invention relates to a flicker correction apparatus, a flicker correction method, and a recording medium storing a flicker correction program capable of preventing the occurrence of a flicker phenomenon. The flicker phenomenon is such that when an object is imaged using an X-Y address scanning type solid-state imaging device under the illumination of a fluorescent lamp flickering in synchronization with the frequency of an alternating current (AC) power source, a striped pattern of dark color portions and light color portions extending in the horizontal direction appear in the image.

2. Description of the Related Art

Electronic cameras, such as video cameras, electronic still cameras, cameras for a videophone, and the like, comprise a CCD type imaging device as an image sensor. The CCD type imaging device requires high power consumption and increases the number of parts. Therefore, it is not easy to construct a small-sized portable electronic camera system employing such a CCD type imaging device. On the other hand, attention has been directed to a CMOS type image sensor, which has low power consumption and in which an image sensor and a peripheral circuit can be mounted on one chip. Such a CMOS type image sensor is a solid-state imaging device in which pixels are provided in a matrix; incident light is converted into an electric signal by an imaging device; electric charge (an image signal) accumulates in a pixel; and the electric charge (the image signal) is read from the pixel by designating is the X-Y address of the pixel. A solid-state imaging device, such as a CMOS type image sensor and the like, is called an X-Y address scanning type solid-state imaging device.

When an object is imaged by an X-Y address scanning type solid-state imaging device, such as a CMOS type image sensor, under the illumination of a general fluorescent lamp which is lighted with an AC power source, since the fluorescent lamp blinks in synchronization with the frequency of the AC power source, the time point of scanning varies depending on the position of a pixel. As a result, bright portions and dark portions are generated in an image, degrading the quality of the image. FIG. 7 is a schematic diagram showing an example of such image quality degradation. In FIG. 7, a striped pattern, in which dark portions and bright portions extending in the horizontal direction are alternately formed, appears in one frame of the image of an apple, i.e., a flicker occurs.

FIG. 8 is a diagram for explaining a principle of the flicker phenomenon which occurs in an X-Y address scanning type solid-state imaging device. For example, it is now assumed that the frequency of an AC power source is 50 Hz, the blink frequency of a fluorescent lamp is 100 Hz, and the frame frequency of an imaging device is 30 Hz. In this case, a vertical scanning time is 33.3 msec during which all pixels are read out from top to bottom. During the vertical scanning time, the fluorescent lamp blinks in synchronization with the frequency of the AC power source. Therefore, in FIG. 8, when a pixel on a $(n-1)^{th}$ line, a pixel on a $n^{th}$ line, and a pixel on a $(n+1)^{th}$ line are read out, the respective amounts of light (the light amounts of a fluorescent lamp) impinging on the imaging device are different from each other. Therefore, a striped pattern in which bright portions and dark portions extending in the horizontal direction are alternately formed is observed in a frame of image, i.e., the quality of an obtained image is degraded. When the vertical scanning time is an integral multiple of one blink cycle of the fluorescent lamp, such a horizontal dark-and-bright striped pattern (horizontal stripes) occurs at the same position on the screen. On the other hand, when the vertical scanning time is not an integral multiple of one blink cycle of the fluorescent lamp, the horizontal dark-and-bright striped pattern moves in the vertical direction on the screen, whereby the image quality is further degraded.

A flicker correction apparatus for correcting a video signal so as to prevent the occurrence of a striped pattern due to such a flicker phenomenon has been disclosed in, for example, Japanese Laid-Open Publication No. 11-252446. This flicker correction apparatus is applied to a MOB type imaging device in which electric charge is read out from a pixel by designating the X-Y address of the pixel. The flicker correction apparatus divides a field of video signal into m regions in each of which a flicker component is substantially uniform, and performs flicker correction for each region. For example, since a flicker component is Considered to be substantially constant on one horizontal line, the intensity of a flicker component is obtained on a line-by-line basis and flicker correction is performed for each line.

FIG. 9 is a schematic block diagram showing a configuration of the flicker correction apparatus disclosed in Japanese Laid-Open Publication No. 11-252446. This flicker correction apparatus has an input terminal 108 through which a video signal 120 containing a flicker is input. The video signal 120 input from the input terminal 108 is supplied to a total level calculation section 101 and a multiplication 106. The total level calculation section 101 integrates the video signal 120 for each region to produce a total level 121 which is in turn output to a switch 102.

For example, it is now assumed that the field frequency of an image signal is 60 Hz and the frequency of an AC power source is 50 Hz. In this case, a fluorescent lamp blinks at a frequency of 100 Hz. Since the field frequency 60 Hz and the blink frequency 100 Hz of the fluorescent lamp have a greatest common divisor of 20 Hz, the same striped pattern occurs every 3 fields in which the stripe alternates between bright and dark. It is now assumed that when brightness $Y_0$ is uniform and a still object Is imaged, an output $Y_{k,i}(T)$ of an imaging device corresponding to an $i^{th}$ pixel in the horizontal direction on a $k^{th}$ line in the vertical direction of a $T^{th}$ field varies in the form of a sine wave with a cycle of 3 fields and the phase of the sine wave is shifted in the direction of the line number k, and $Y_{k,i}(T)$ of pixels on line k have substantially the same phase irrespective of position i. In this case, $Y_{k,i}(T)$ is represented by:

$$Y_{k,i}(T) \approx Y_0\{1 + A\sin(2\pi T/3 + \alpha k)\}$$

where A represents the amplitude of a flicker and $\alpha$ represents a phase coefficient relating to a vertical position.

In this case, the total level calculation section 101 calculates a total level $V_k(T)$ by integrating $Y_{k,i}(T)$ of all pixels on line k in accordance with the following formula.

$$V_k(T) = \sum_{i=1}^{n} Y_{k,1}(T) = V_0\{1 + A\sin(2\pi T/3 + \alpha k)\} \quad \text{(Formula 1)}$$

In this manner, the total level 121 is changed by a factor of $\{1+A \sin(2\pi T/3+\alpha k)\}$ due to an influence of a flicker. Therefore, if the total level 121 is multiplied by the Inverse of the factor, the flicker component can be canceled. Note that in Formula 1, $V_0$ represents the total of the direct current components (non-flicker components) of the output of an imaging device (the video signal 120), and n represents the number of effective pixels on a line.

The flicker correction apparatus is provided with a region selection signal production section 107. This region selection signal production section 107 produces a region selection signal 122 indicating which of a region 1 to a region m the video signal 120 belongs to. The region selection signal 122 is supplied to a switch (SW) 102 and a switch (SW) 105. The switch 102 switches a connection of the total level 121 in accordance with the region selection signal 122, and outputs the total level 121 to a total level storage section 103 in a region selected by the selection signal 122.

The total level storage section 103 comprises three shift registers and the like, and performs a shift operation in synchronization with a vertical synchronization signal such that a total level 123 of a first previous field, a total level 124 of a second previous field, and a total level 125 of a third previous field are always held. Total levels $V_k(T-1)$, $V_k(T-2)$, and $V_k(T-3)$ of three previous fields from a field number T are stored, and each are output to a flicker gain calculation section 104.

The flicker gain calculation section 104 comprises an averaging circuit and a division circuit, and calculates a flicker gain 126 from a plurality of total levels 123 to 125, which is in turn output to a flicker component extraction section 115.

An average $AVE_k(T)$ of the total levels 123 to 125 of three fields is calculated based on the properties of trigonometric functions by the following formula.

$$AVE_k(T)=\{V_k(T-1)+V_k(T-2)+V_k(T-3)\}/3=V_0 \quad \text{(Formula 2)}$$

Therefore, $AVE_k(T)$ is constant irrespective of a field number T. Therefore, the following formula is obtained from Formulas (1) and (2):

$$\{1+A \sin(2\pi T/3+\alpha k)\}=V_k(T)/V_0=V_k(T)/AVE_k(T) \quad \text{(Formula 3)}.$$

In this case, the total level $V_k(T)$ has a cycle of 3 fields, and therefore, $V_k(T)=V_k(T-3)$ is established. Therefore, the flicker gain calculation section 104 can calculate a flicker gain $F_k(T)$ from Formula 3 by:

$$F_k(T)=1/\{1+A \sin(2\pi T/3+\alpha k)\}=AVE_k(T)/V_k(T-3).$$

The flicker gain $F_k(T)$ is a coefficient for canceling the flicker component of the output $Y_{k,i}(T)$ of an imaging device, defined as the inverse of the flicker component, i.e., $1/\{1+A \sin(2\pi T/3+\alpha k)\}$.

The flicker component extraction section 115 comprises a Fourier transform circuit 117 and a high frequency component removing circuit 118. The flicker component extraction section 115 extracts a frequency component 140 from the flicker gain 126 to produce a flicker extraction signal 141, which is in turn output to flicker gain production section 116.

Specifically, in the flicker component extraction section 115, the Fourier transform circuit 117 is first used to subject L flicker gains $F_k(T)$ (k=1,2, ..., L) of m flicker gains of field number T to discrete Fourier transform so as to calculate the frequency component 140 of the flicker gain 126. A component $R_f(T)$ corresponding to a frequency f is represented by:

$$R_f(T) = \sum_{k=1}^{L} F_k(T)e^{-j2\pi f(k-1)/L}. \quad \text{(Formula 4)}$$

For example, a NTSC video signal has a horizontal scanning frequency of 15.75 kHz. When an AC power source has a frequency of 50 Hz and thus a fluorescent lamp has a blink frequency of 100 Hz, a flicker phenomenon occurs in which a stripe alternates between bright and dark every 157.5 lines. In this case, since the flicker gain $F_k(T)$ has a cycle of 157.5 lines, L is set to be 158 so that the flicker gains 126 corresponding to about one cycle can be subjected to a Fourier transform. Note that when L is an integral multiple of the cycle of a flicker gain, it is possible to improve the calculation precision of the frequency component 140 of the flicker gain, however, when L is not an integral multiple of the cycle of a flicker gain, it is possible to improve the precision by multiplying the flicker gain 126 by a window function before performing the Fourier transform. Although the flicker gains of line 1 to line L are subjected to a Fourier transform in the above-described technique, other lines can be used.

In this way, among the frequency components 140 of the flicker gain, only the frequency component of the flicker component is left and the other frequency components are set to be zero by the high frequency component removing circuit 118, thereby producing the flicker extraction signal 141. For example, if flicker gains corresponding to one cycle are transformed into the frequency component 140, the flicker component 140 is dominated by $R_1(T)$ indicating a fundamental wave. Therefore, if only a direct current component (f=0) and a fundamental wave (f=1) are left, a flicker extraction signal $Q_f(T)$ is represented by:

$$\left.\begin{array}{l} Q_f(T) = R_f(T)(f=0, 1) \\ Q_f(T) = 0 (f \geq 2) \end{array}\right\} \quad \text{(Formula 5)}$$

Note that if it is not easy to approximate a flicker component only by a fundamental wave, second-order and third-order harmonic components may be left.

The flicker gain production section 116 comprises an inverse Fourier transform circuit 119, and produces a control gain 130 by performing a convolution of sine waves corresponding to the flicker extraction signal 141. The control gain 130 is output to the switch (SW) 106. A control gain $G_k(T)$ is represented by:

$$G_k(T) = 1/L \sum_{i=0}^{L-1} Q_i(T)e^{j2\pi(k-1)i/L}. \quad \text{(Formula 6)}$$

The control gain 130 is calculated for each of k=1, 2, . . . , m and is output to the switch (SW) 105.

The switch (SW) 105 receives the input control gain 130 and outputs a control gain 131 of a region selected by the region selection signal 122 to the multiplication 106. The multiplication 106 multiplies the input video signal 120 by the input control gain 131 and outputs it.

Thus, by performing flicker correction for each region having substantially the same flicker component, a flicker component can be removed in the case of a camera comprising an imaging device, such as a pickup tube, a MOS type imaging device, or the like, in which a flicker component varies in the vertical direction in the form of a sine wave in one field.

However, in the above-described conventional flicker correction apparatus, a video signal is subjected to flicker correction even when an object is imaged under the illumination of sunlight which causes no flicker phenomenon. In this case, an image is adversely affected by flicker correction. Regions may have a different AC power source frequency and an imaging device may be used in such regions. For example, there are a region having an AC power source frequency of 50 Hz and another region having an AC power source frequency of 60 Hz. When the above-described imaging device is used in these regions having different AC power source frequencies, the constants for correction have to be adjusted for each region Therefore, the user has to control the operation of a flicker correction apparatus depending on the illumination and the AC power source frequency.

A frame frequency (or a field frequency) may vary depending on the system conditions of a camera. In some cases, data of a third or more previous frames may be required in order to calculate a flicker gain. For example, when a fluorescent lamp blinks at 100 Hz and the frame frequency of an imaging device is 14 Hz, the same bright-and-dark stripe pattern is generated every 7 frames. Therefore, data of 7 previous frames are required. Therefore, it takes a long time to correct a flicker depending on the frame or field frequency of an imaging device.

SUMMARY OF THE INVENTION

According to an aspect of the present invention, a flicker correction apparatus for correcting a flicker component of an image signal obtained by imaging an object using an imaging device is provided. The apparatus comprises: an image average calculation section for calculating an average of the image signal for each line or each group of lines in a horizontal or vertical direction: a flicker frequency calculation section for calculating a flicker frequency using an AC power source frequency and a frame or field frequency of the imaging device: a flicker data extraction section for extracting flicker data using the average of the image signal calculated by the image average calculation section and the flicker frequency calculated by the flicker frequency calculation section; a flicker determination section for determining the presence or absence of a flicker phenomenon using the flicker data: a flicker correction amount calculation section for calculating a flicker correction amount using the flicker data; and a flicker correction section for removing the flicker component of the image data using the flicker correction amount calculated by the flicker correction amount calculation section and based on the determination by the flicker determination section.

Therefore, the flicker determination section can determine the presence or absence of a flicker phenomenon, thereby making it possible not to perform flicker correction for an image obtained under the illumination which does not cause a flicker phenomenon, such as sunlight or the like. Moreover, flicker data is extracted using the average of image signals calculated for each line or each group of lines in the horizontal or vertical direction, and a flicker frequency calculated using an AC power source frequency and the frame or field frequency of an image device. A flicker correction amount is calculated from the flicker data. Therefore, data corresponding to frames or fields having the same bright or dark stripe is not required as is different from conventional flicker correction apparatuses. Therefore, flicker correction can be rapidly performed irrespective of the frame or field frequency of an imaging device.

In one embodiment of this invention, the flicker correction apparatus further comprises an image memory for storing the image signal. The flicker correction section removes the flicker component of the image signal stored in the image memory using the flicker correction amount calculated by the flicker correction amount calculation section.

In one embodiment of this invention, the flicker correction apparatus further comprises a flicker phase difference calculation section for calculating a flicker phase difference, which is a phase difference between a flicker frequency of a past frame or field and a flicker frequency of a current frame or field, using the AC power source frequency and the frame or field frequency of the imaging device. The flicker correction amount calculation section calculates a flicker correction amount using flicker data extracted from a past frame or field by the flicker data extraction section and the flicker phase difference calculated by the flicker phase difference calculation section, and the flicker correction section removes a flicker component of an image signal of a current frame or field using the flicker correction amount calculated by the flicker correction amount calculation section.

Therefore, flicker data is extracted from a past frame(s) or field(s) using the average of image signals calculated for each line or each group of lines in the horizontal or vertical direction: and a flicker frequency calculated using an AC power source frequency and the frame or field frequency of an image device. A flicker correction amount is calculated from the flicker data and a flicker phase difference, which is a phase difference between the flicker frequency of the past frame or field and the flicker frequency of the current frame or field. Therefore, data corresponding to frames or fields having the same bright or dark stripe is not required as is different from conventional flicker correction apparatuses. Therefore, flicker correction can be rapidly performed irrespective of the frame or field frequency of an imaging device.

In one embodiment of this invention, the flicker correction amount calculation section calculates the flicker correction amount depending on a brightness of a pixel to be corrected in one frame or field of the image signal.

Therefore, flicker correction can be performed depending on the brightness of a pixel. Therefore, even when a dark region is present in one frame or one field of image signals, flicker correction can be appropriately performed.

In one embodiment of this invention, the flicker correction apparatus further comprises a flicker information storage section for storing information relating to the presence or absence of a flicker phenomenon output from the flicker determination section. The flicker determination section determines the presence or absence of a flicker phenomenon by referencing the information relating to the presence or absence of a past flicker phenomenon stored in the flicker information storage section.

By referencing to flicker information of past frames or fields, flicker correction can be performed if a flicker phenomenon occurs during a period of several frames or fields, whereby error is reduced when determining whether or not correction of a flicker phenomenon is performed.

In one embodiment of this invention, the flicker frequency calculation section calculates a first flicker frequency using a first AC power source frequency and the frame or field frequency of the imaging device, and calculates a second flicker frequency using a second AC power source frequency and the frame or field frequency of the imaging device. The flicker data extraction section comprises a first flicker data extraction sub-section for extracting first flicker data using the average of the image signal calculated by the image average calculation section and the first flicker frequency, and a second flicker data extraction sub-section for extracting second flicker data using the average of the image signal calculated by the image average calculation section and the second flicker frequency. The flicker determination section determines the presence or absence of a flicker phenomenon using the first and second flicker data. The flicker correction amount calculation section calculates a flicker correction amount using the first or second flicker data based on the determination by the flicker determination section.

Therefore, the flicker determination section can determine the presence or absence of a flicker phenomenon for each AC power source frequency. Even when an AC power source frequency is changed, a flicker can be appropriately corrected.

According to another aspect of the present invention, a flicker correction method for correcting a flicker component of an image signal obtained by imaging an object using an imaging device is provided. The method comprises the steps of: calculating an average of the image signal for each line or each group of lines in a horizontal or vertical direction: calculating a flicker frequency using an AC power source frequency and a frame or field frequency of the imaging device; extracting flicker data using the average of the image signal and the flicker frequency; determining the presence or absence of a flicker phenomenon using the flicker data; calculating a flicker correction amount using the flicker data; and removing the flicker component of the image signal using the flicker correction amount based on the determination of the presence or absence of a flicker phenomenon.

According to this method, the presence or absence of a flicker phenomenon can be determined, thereby making it possible not to perform flicker correction for an image obtained under the illumination which does not cause a flicker phenomenon, such as sunlight or the like.

In one embodiment of this invention, the flicker correction method further comprises storing the image signal input from the imaging device. The removing step comprises removing the flicker component from the stored image signal using the flicker correction amount.

Therefore, a reduction in image quality due to a flicker phenomenon can be prevented in an image obtained by an electronic still camera, a PC camera, or the like, comprising an X-Y address scanning type solid-state imaging device under the illumination of a fluorescent lamp blinking in synchronization with an AC power source, thereby making it possible to display a high-quality image.

In one embodiment of this invention, the flicker correction method further comprises: calculating a flicker phase difference, which is a phase difference between a flicker frequency of a past frame or field and a flicker frequency of a current frame or field, using the AC power source frequency and a frame or field frequency of the imaging device. The flicker correction amount calculating step comprises calculating a flicker correction amount using flicker data of a past frame or field and the flicker phase difference. The flicker component removing step comprises removing a flicker component of an image signal of a current frame or field using the flicker correction amount.

Therefore, a reduction in image quality due to a flicker phenomenon can be prevented in an image obtained by an electronic still camera, a PC camera, or the like, comprising an X-Y address scanning type solid-state imaging device under the illumination of a fluorescent lamp blinking in synchronization with an AC power source, thereby making it possible to display a high-quality image.

In one embodiment of this invention, the flicker frequency calculating step comprises calculating a first flicker frequency using a first AC power source frequency and the frame or field frequency of the imaging device, and calculating a second flicker frequency using a second AC power source frequency and the frame or field frequency of the imaging device. The flicker data extracting step comprises extracting first flicker data using the average of the image signal and the first flicker frequency, and extracting second flicker data using the average of the image signal and the second flicker frequency. The flicker phenomenon determining step comprises determining the presence or absence of a flicker phenomenon using the first and second flicker data. The flicker correction amount calculating step comprises calculating a flicker correction amount using the first or second flicker data based on the determination of the presence or absence of a flicker phenomenon.

Therefore, the presence or absence of a flicker phenomenon for each AC power source frequency can be determined, even when an AC power source frequency is changed, a flicker can be appropriately corrected.

According to another aspect of the present invention, a recording medium storing a flicker correction program for controlling a procedure of the above-described flicker correction method is provided.

Therefore, a reduction in image quality due to a flicker phenomenon can be prevented in an image obtained by an electronic still camera, a PC camera, or the like, comprising an X-Y address scanning type solid-state imaging device under the illumination of a fluorescent lamp, blinking in synchronization with an AC power source, thereby making it possible to display a high-quality image, by software without particular hardware.

Thus, the invention described herein makes possible the advantages of providing a flicker correction apparatus, a flicker correction method, and a recording medium storing a flicker correction program capable of performing rapid flicker correction irrespective of the frame or field frequency of an imaging device even when illumination and an AC power source frequency are changed.

These and other advantages of the present invention will become apparent to those skilled in the art upon reading and understanding the following detailed description with reference to the accompanying figures.

BRIEF DESCRIPTION OF THE DRAWINGS

FIG. 9 is a schematic block diagram showing a configuration of a conventional flicker correction apparatus.

DESCRIPTION OF THE PREFERRED EMBODIMENTS

Hereinafter, the present invention will be described by way of illustrative examples with reference to the accompanying drawings.

EXAMPLE 1

Figure 1:
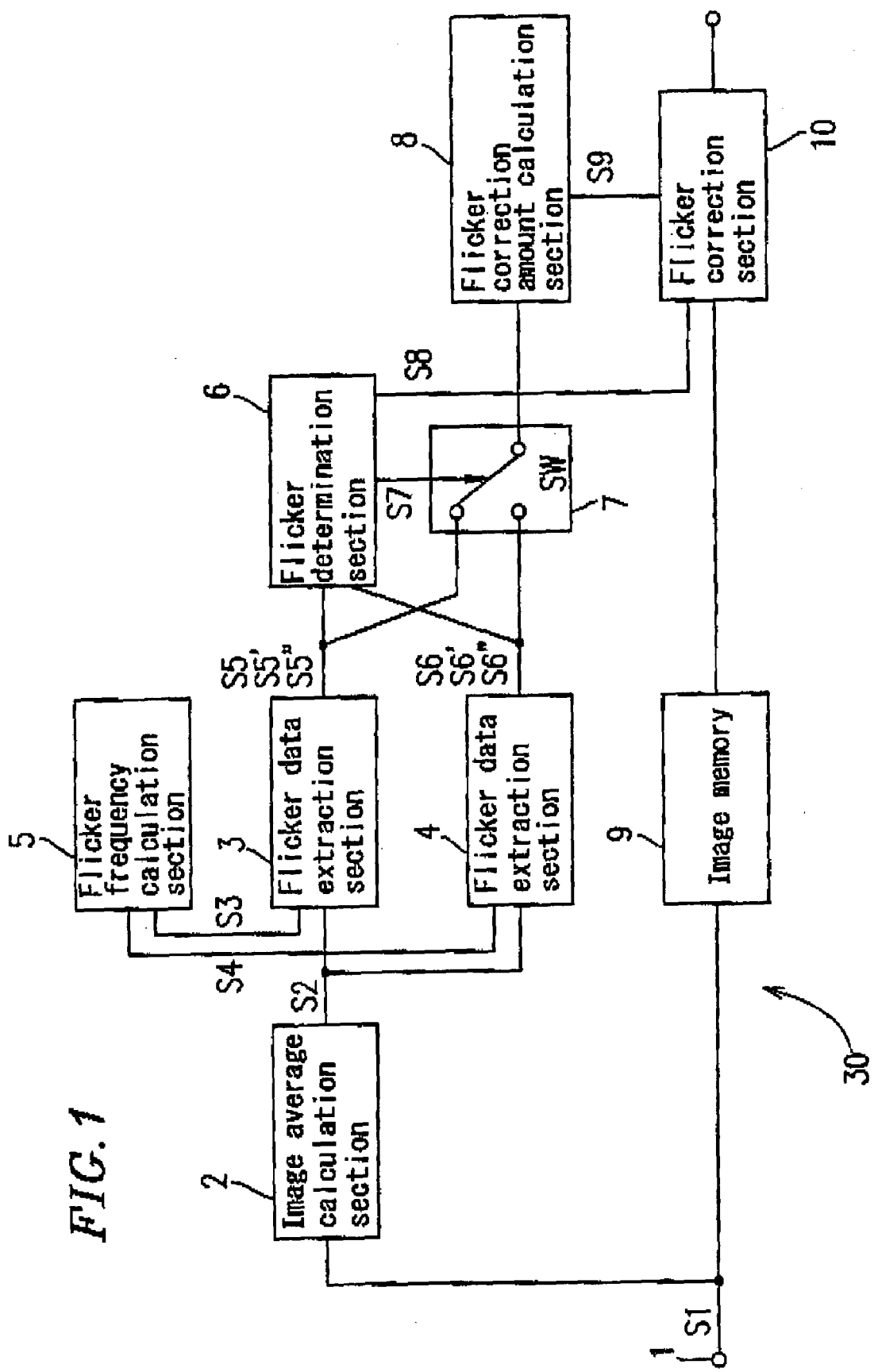
FIG. 1 is a schematic block diagram showing a configuration of a flicker correction apparatus according to Example 1 of the present invention.

FIG. 1 is a schematic block diagram showing a configuration of a flicker correction apparatus 30 according to Example 1 of the present invention.

This flicker correction apparatus 30 has an input terminal 1 through which an image signal S1 is input. The image signal S1 is obtained by imaging an object using a camera comprising an imaging device, such as an electronic camera, a scanner, or the like. For example, when an object is imaged by a camera comprising an X-Y address scanning type solid-state imaging device (e.g., a CMOS type image sensor, etc.) under the illumination of a fluorescent lamp which blinks in synchronization with the frequency of an AC power source, the image signal Si containing a flicker component is input through the input terminal 1.

The image signal S1 input through the input terminal 1 is supplied to an image memory 9, and one frame or one field of the image signal is stored as image data into the image memory 9. The image signal S1 is also supplied to an image average calculation section 2.

The image average calculation section 2 calculates the average of image signals on each horizontal line based on the input image signal S1, and outputs an image average S2 to flicker data extraction sections 3 and 4. The image average calculation section 2 can calculate the average of image signals for each group of lines or can calculate the average of image signals in the vertical direction.

The flicker frequency calculation section 5 calculates a flicker frequency based on the frequency of an AC power source and the frame or field frequency of the imaging device. Specifically, the flicker frequency calculation section 5 calculates and outputs a flicker frequency S3 to a flicker data extraction section 3 assuming that the AC power source frequency is a first frequency, e.g., 50 Hz, and also calculates and outputs a flicker frequency S4 to a flicker data extraction section 4 assuming that the AC power source frequency is a second frequency, e.g., 60 Hz.

The flicker data extraction section 3 subjects the image average S2 input from the image average calculation section 2 to discrete Fourier transform so as to calculate a spectral amount S5 of the flicker frequency S3 input from the flicker frequency calculation section 5 and spectral amounts S5' and S5" of frequencies around the flicker frequency S3. The spectral amounts S5, S5' and S5" are output to a flicker determination section 6.

The flicker data extraction section 4 subjects the image average S2 input from the image average calculation section 2 to discrete Fourier transform so as to calculate a spectral amount S6 of the flicker frequency S4 input from the flicker frequency calculation section 5 and spectral amounts S6' and S6" of frequencies around the flicker frequency S4. The spectral amounts S6, S6' and S6" are output to a flicker determination section 6.

The flicker determination section 6 determines the presence or absence of a flicker phenomenon based on the spectral amounts S5, S5' and 5" and also determines the presence or absence of a flicker phenomenon based on the spectral amounts S6, S6' and S6", and outputs a result of the determination as flicker information S8 to a flicker correction section 10.

When the presence of a flicker phenomenon is detected, the flicker determination section 6 determines which AC power source frequency causes the flicker phenomenon, 50 Hz or 60 Hz. The result is output as flicker information S7 to a switch (SW) 7. The switch (SW) 7 is switched based on the flicker information S7 so that the spectral amounts S5, S5' and S5" or the spectral amounts 66, S6' and S6" are output to a flicker correction amount calculation section 8 depending on the AC power source frequency which is determined to cause the flicker phenomenon. When the absence of a flicker phenomenon is detected, flicker information S8 indicating the absence of a flicker phenomenon is input to the flicker correction section 10, so that no correction is performed.

The flicker correction amount calculation section 8 subjects the spectral amount S5 or S6 input from the SW 7 to inverse discrete Fourier transform so as to calculate a correction amount S9 which is in turn output to the flicker correction section 10.

The flicker correction section 10 adds the flicker correction amount S9 input from the flicker correction amount calculation section 8 to image data containing a flicker component stored in the image memory 9 to cancel the flicker component.

Figure 2:
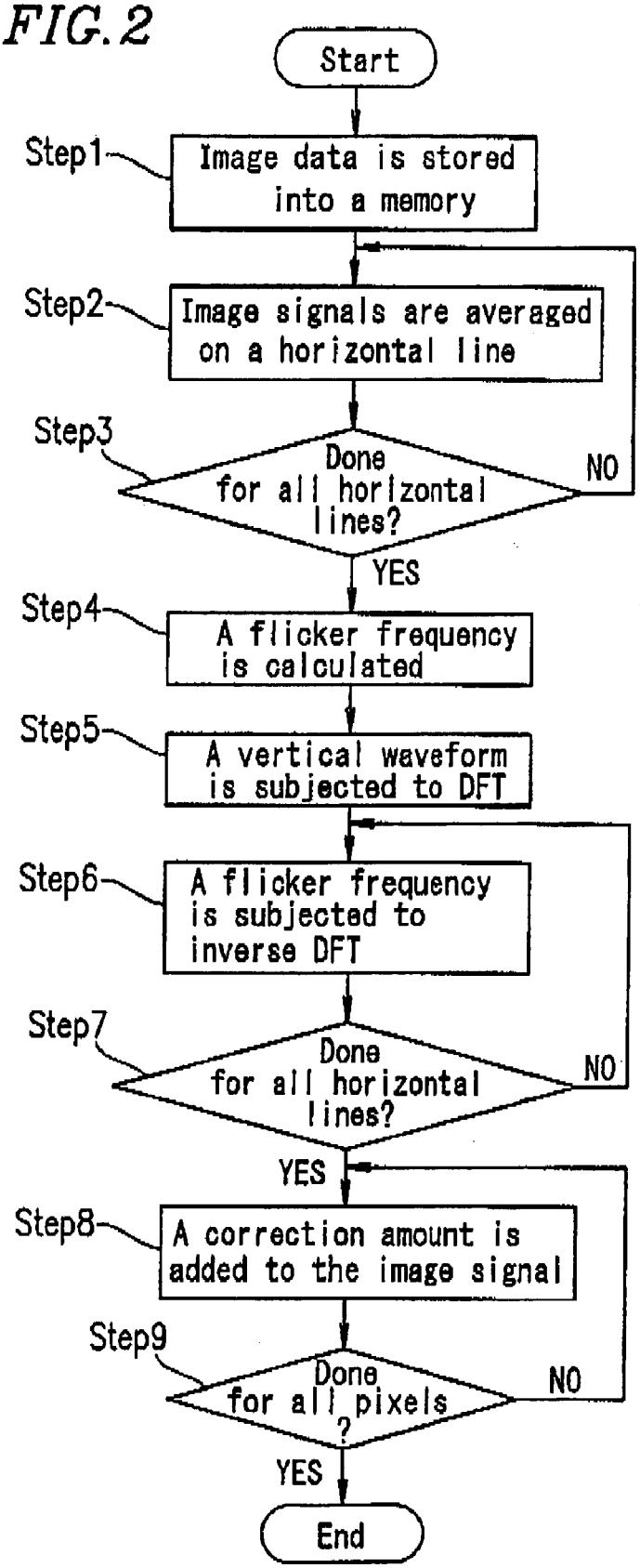
FIG. 2 is a flowchart for explaining a procedure of a flicker correction method according to Example 1 of the present invention.

Hereinafter, a flicker correction method using the thus-obtained flicker correction apparatus 30 of Example 1 will be described with reference to a flowchart shown in FIG. 2.

In Step 1, the image signal S1 containing a flicker component is stored as image data into the image memory 9.

In Step 2, in order to reduce an influence dependent on an object, the image average calculation section 2 calculates the average S2 of the image signal S1 for each line or each group of lines in the horizontal or vertical direction. In Step 3, it is determined whether or not averaging of image signals is completed for all lines.

For example, when averaging of image signals is performed in the horizontal direction for an output image having w horizontal pixels x h vertical pixels, the average of image signals on a $y^{th}$ line is calculated by:

$$S_y = \frac{1}{W}\sum_{x=0}^{W-1} S_{x,y}$$ (Formula 7)

where $S_y$ represents the average of image signals on a $y^{th}$ line and $S_{x,y}$ represents the value of an image signal at an $x^{th}$ pixel on a $y^{th}$ line.

Similarly, averaging can be performed for each group of lines but not for each line, or averaging can be performed in the vertical direction.

When averaging of image signals is completed for all lines, the flicker frequency calculation section 5 calculates the flicker frequencies S3 and S4 based on the frequencies of AC power sources and the frame or field frequency of an imaging device (Step 4).

For example, a flicker frequency f can be calculated by:

$$f = (2F/R) \times (h/H) \quad \text{(Formula 8)}$$

where F represents the AC power source frequency of a fluorescent lamp, R represents the frame frequency of an imaging device, H represents the number of vertical pixels in one frame of the imaging device, and h represents the number of vertical pixels in an output image.

Frequencies $f_l$ and $f_h$ around the flicker frequency f can be assumed to be f−1 and f+1, respectively.

In Step 5, the flicker data extraction section 3 subjects the average S2 of the image signal S1 to Fourier transform to extract the spectral amount S5 of the flicker frequency S3 and the spectral amounts S5' and S5" of frequency components around the flicker frequency S3 as flicker data. Also in Step 5, the flicker data extraction section 4 subjects the average S2 of the image signal S1 to Fourier transform to extract the spectral amount S6 of the flicker frequency S4 and the spectral amounts S6' and S6" of frequency components around the flicker frequency S4 as flicker data.

For example, when the image signal average (a waveform in the vertical direction) $S_y$ obtained by averaging image signals in the horizontal direction, is subjected to discrete Fourier transform (DFT) so as to be transformed into spatial frequency, the real part S_Re[f'], imaginary part S_Im[f'] and power spectrum S_Pw[f'] of the spectral amount of the image signal average (a waveform in the vertical direction) $S_y$ with respect to an arbitrary frequency f' are respectively calculated by:

$$\begin{cases} S\_Re[f'] = \sum_{y=0}^{h-1} \left\{ S_y \cos\left(\frac{-2\pi}{h} \times f' \times y\right) \right\} & \text{(Formula 9)} \\ S\_Im[f'] = \sum_{y=0}^{h-1} \left\{ S_y \sin\left(\frac{-2\pi}{h} \times f' \times y\right) \right\} & \text{(Formula 10)} \\ S\_Pw[f'] = (S\_Re[f'])^2 + (S\_Im[f'])^2 & \text{(Formula 11)} \end{cases}$$

When a flicker phenomenon occurs, the spectral amount of the flicker frequency f is greater than the spectral amounts of the respective frequencies $f_l$ and $f_h$ around the flicker frequency f. Therefore, the flicker determination section 6 can detect when a flicker phenomenon occurs, if the power spectra S_Pw[f], S_Pw[$f_l$] and S_Pw[$f_h$] of the respective flicker frequency f, and the frequencies $f_l$ and $f_h$ around the flicker frequency f of the image signal average $S_y$ satisfy the following conditions:

$$S\_Pw[f_l] \times N < S\_Pw[f] \text{ and } S\_Pw[f_h] \times N < S\_Pw[f] \quad \text{(Formula 12)}$$

where N represents an arbitrary constant indicating the steepness of a peak.

It is assumed that a region has an AC power source frequency of 50 Hz while another region has an AC power source frequency of 60 Hz. In such a situation, the flicker determination section 6 determines the presence or absence of a flicker phenomenon based on the spectral amounts S5, S5' and S5" assuming that the AC power source frequency is 50 Hz and also determines the presence or absence of a flicker phenomenon based on the spectral amounts S6, S6' and S6" assuming that the AC power source frequency is 60 Hz, thereby making it possible to determine the AC power source frequency.

In Step 6, the flicker correction amount calculation section 8 subjects the flicker data S5, S5' and S5", or S6, S6' and S6" of the flicker frequencies S3 or S4 to inverse Fourier transform so as to calculate the flicker correction amount S9. In Step 7, it is determined whether or not calculation of a flicker correction amount is performed for all lines.

A waveform having an inverse phase to a flicker component is added to an image signal so as to perform correction. A flicker correction amount $dS_y$ for a $y^{th}$ line is calculated by subjecting the S_Re[f] and S_Im[f] of a flicker frequency to inverse discrete Fourier transform (inverse DFT) in accordance with the following formula.

$$dS_y = -2 \times \frac{1}{h} \times \left\{ S\_Re[f]\cos\left(\frac{-2\pi}{h} \times f \times y\right) + S\_Im[f]\sin\left(\frac{-2\pi}{h} \times f \times y\right) \right\} \quad \text{(Formula 13)}$$

When calculation of a flicker correction amount is completed for all lines, the flicker correction section 10 adds the calculated flicker correction amount S9 to image data stored in the image memory 9 so as to remove a flicker component in Step 8. In Step 9, it is determined whether or not all pixels are processed, and if yes, the flicker correction process is ended.

Such a flicker correction process can be achieved by hardware, or alternatively, by a computer system using a recording medium storing a flicker correction program for controlling a procedure for flicker correction.

Figure 3:
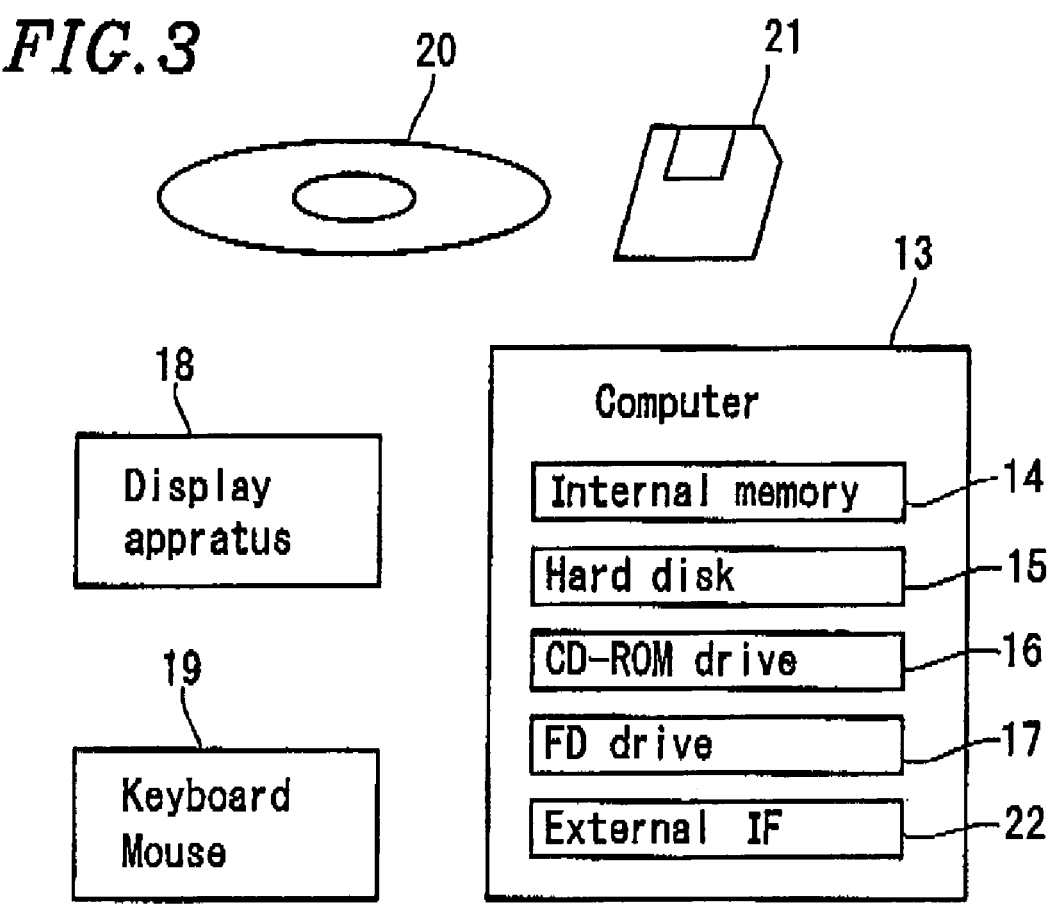
FIG. 3 is a diagram showing an exemplary system configuration capable of performing flicker correction using a flicker correction program according to Example 1 of the present invention.

FIG. 3 is a diagram showing an exemplary system configuration capable of performing flicker correction using a recording medium storing the above-described flicker correction program.

In this system, the above-described flicker correction program is stored in a recording medium, such as CD-ROM 20, a floppy disk (FD) 21, or the like. A computer 13 reads the flicker correction program recorded in the CD-ROM 20 via a CD-ROM drive 16, or reads the flicker correction program recorded in the FD 21 via a FD drive 17, and the installs the program into a hard disk 15. When the computer 13 receives an image signal containing a flicker component from a recording medium, such as the CD-ROM 20, the FD 21, or the like, or an external interface (IF) 22, the computer 13 writes the flicker correction program to an Internal memory 14 and performs a flicker correction process as required. The computer 13 can be controlled by entering a command via a keyboard, a mouse 19, or the like. The computer 13 can also display an image on a display apparatus 18 using an image signal which has been subjected to flicker correction.

EXAMPLE 2

Figure 4:
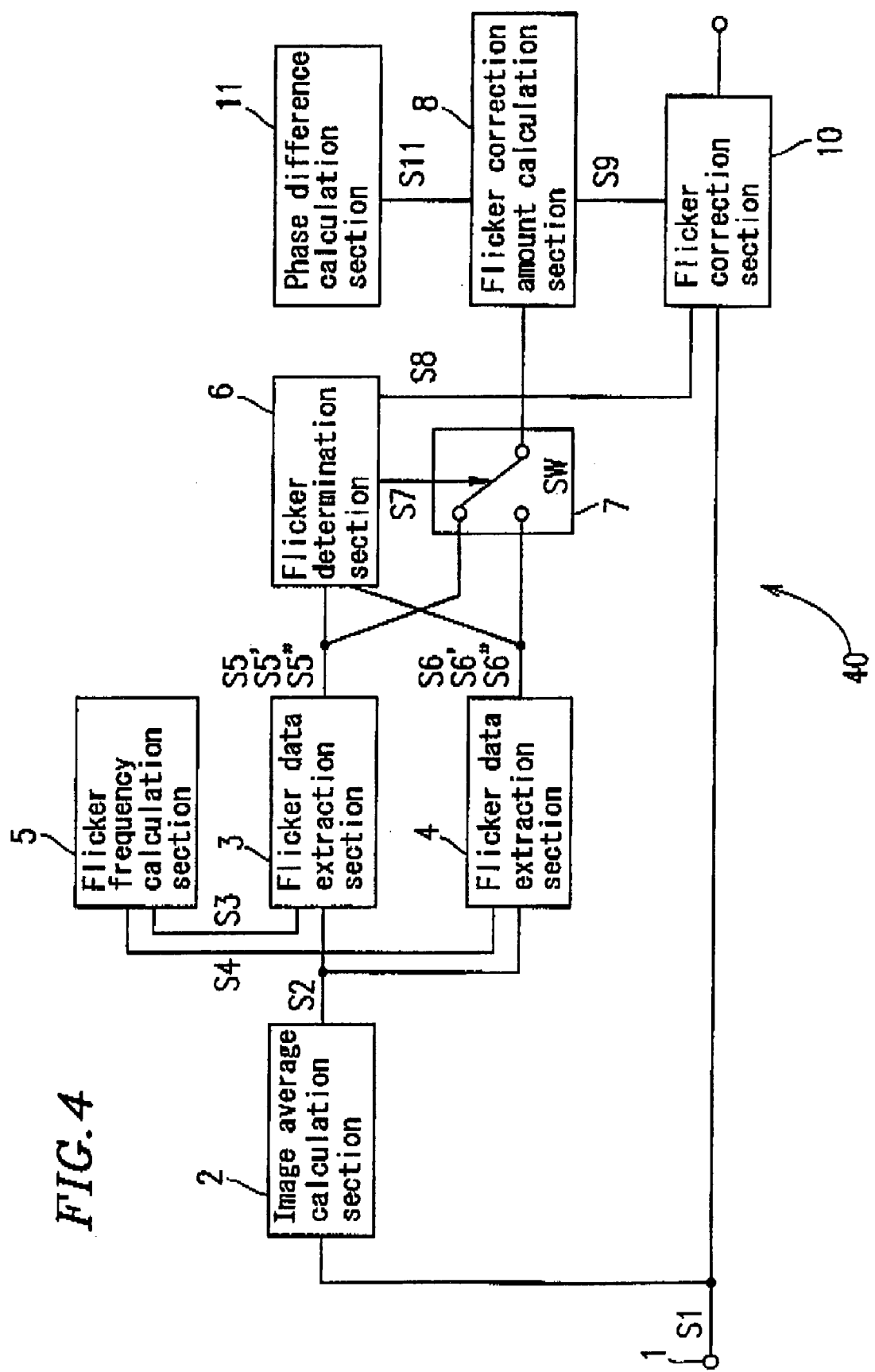
FIG. 4 is a schematic block diagram showing a configuration of a flicker correction apparatus according to Example 2 of the present invention.

FIG. 4 is a schematic block diagram showing a configuration of a flicker correction apparatus 40 according to Example 2 of the present invention.

This flicker correction apparatus 40 is not provided with an image memory 9 as in the flicker correction apparatus 30 of Example 1 (FIG. 1). For example, a flicker correction amount is calculated based on a frame or field of the image signal previously input through an input terminal 1, such as a first previous frame or field, and such a flicker correction amount is used to correct a frame or field of the image signal currently input through the input terminal 1. In this case, there is a difference in the phase of a flicker component between the previous frame (or field) and the current frame (or field), and therefore, flicker correction has to be performed by taking the phase difference into consideration. In order to calculate the phase difference, the flicker correction apparatus 40 of Example 2 is provided with a phase difference calculation section 11.

An image signal S1 input through an input terminal 1 is supplied to an image average calculation section 2 and a flicker correction section 10 as in the flicker correction apparatus 30 of Example 1.

The phase difference calculation section 11 calculates a phase difference S11 between the flicker frequency of the previous frame (or field) and the flicker frequency of the current frame (or field) based on the frequency of an AC power source and the frame or field frequency of an imaging device, and outputs the phase difference S11 to a flicker correction amount calculation section 8.

For example, when the cycle of the flicker component T is H·R/2F, the phase difference $\Delta y$ for one frame is calculated by:

$$\Delta y = H - nT \quad \text{(Formula 14)}$$

(note: n is the maximum natural number satisfying H>nT).

The flicker correction amount calculation section 8 takes into consideration the phase difference S11 input from the phase difference calculation section 11 when subjecting the spectral amount S5 or S6 calculated based on image signal of the previous frame or field, input through the SW 7 as in Example 1, to inverse discrete Fourier transform so as to calculate a correction amount S9. The correction amount S9 is output to a flicker correction section 10.

The flicker correction section 10 adds the flicker correction amount S9 calculated based on an image signal of the previous frame or field, input through the flicker correction amount calculation section 8, to an image signal of the current frame or field so as to cancel a flicker component.

For example, an output $S_{x,y'}$ of an $x^{th}$ pixel on a $y^{th}$ line is calculated by:

$$S_{x,y'} = S_{x,y} + dS_{y+\Delta y'} \quad \text{(Formula 15)}.$$

The other portions of the configuration and the correction process of the flicker correction apparatus 40 of Example 2 are similar to those in Example 1, and the description thereof is omitted.

EXAMPLE 3

Figure 5:
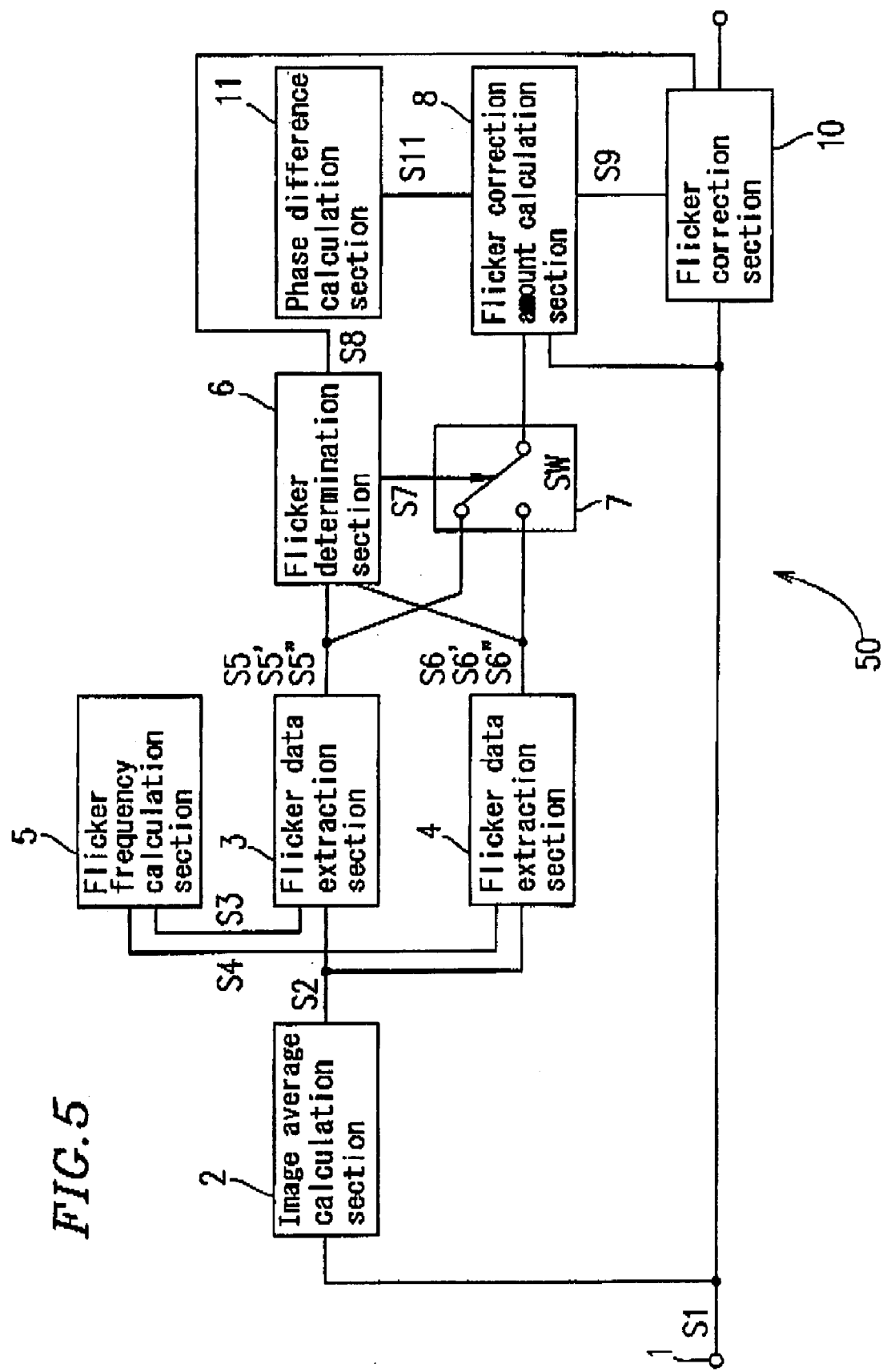
FIG. 5 is a schematic block diagram showing a configuration of a flicker correction apparatus according to Example 3 of the present invention.

FIG. 5 is a schematic block diagram showing a configuration of a flicker correction apparatus 50 according to Example 3 of the present invention.

In this flicker correction apparatus 50, an image signal S1 input through an input terminal 1 is supplied to an image average calculation section 2 and a flicker correction section 10 as in the flicker correction apparatus 40 of Example 2 (FIG. 4). Further, the image signal S1 is supplied to a flicker correction amount calculation section 8.

A horizontal, bright-and-dark striped pattern due to a flicker phenomenon is less conspicuous in a dark portion of an object than in a bright portion since a contrast is reduced in a dark portion. Therefore, when a bright pixel and a dark pixel are present on the same horizontal line in one frame or field of image, if the same flicker correction amount is added to the bright pixel and the dark pixel, an image may be degraded.

In order to avoid such image degradation, in the flicker correction apparatus 50 of Example 3, a flicker correction amount calculation section 8 calculates a flicker component or a correction amount S9 depending on the brightness of a pixel to be corrected in one frame or field of image signal, and outputs the correction amount S9 to a flicker correction section 10.

For example, a correction amount for an $x^{th}$ pixel on a $y^{th}$ line is calculated by the following formula in accordance with a brightness threshold $DY_{th}$ which can be arbitrarily selected.

$$\left. \begin{array}{ll} dS'_y = dS_y \times \dfrac{S_{x,y}}{DS_{th}} & (S_{x,y} < DS_{th}) \\ dS'_y = dS_y & (S_{x,y} \geq DS_{th}) \end{array} \right\} \quad \text{(Formula 16)}$$

The flicker correction section 10 adds the flicker correction amount S9 calculated based on an image signal of the previous frame or field, Input from the flicker correction amount calculation section 8, to an image signal of the current frame or field so as to cancel a flicker component.

For example, a corrected output $S_{x,y'}$ for an $x^{th}$ pixel on a $y^{th}$ line is calculated by:

$$S_{x,y'} = S_{x,y} + dS'_y \quad \text{(Formula 17)}.$$

The other portions of the configuration and the correction process of the flicker correction apparatus 50 of Example 3 are similar to those in Example 2, and the description thereof is omitted.

EXAMPLE 4

Figure 6:
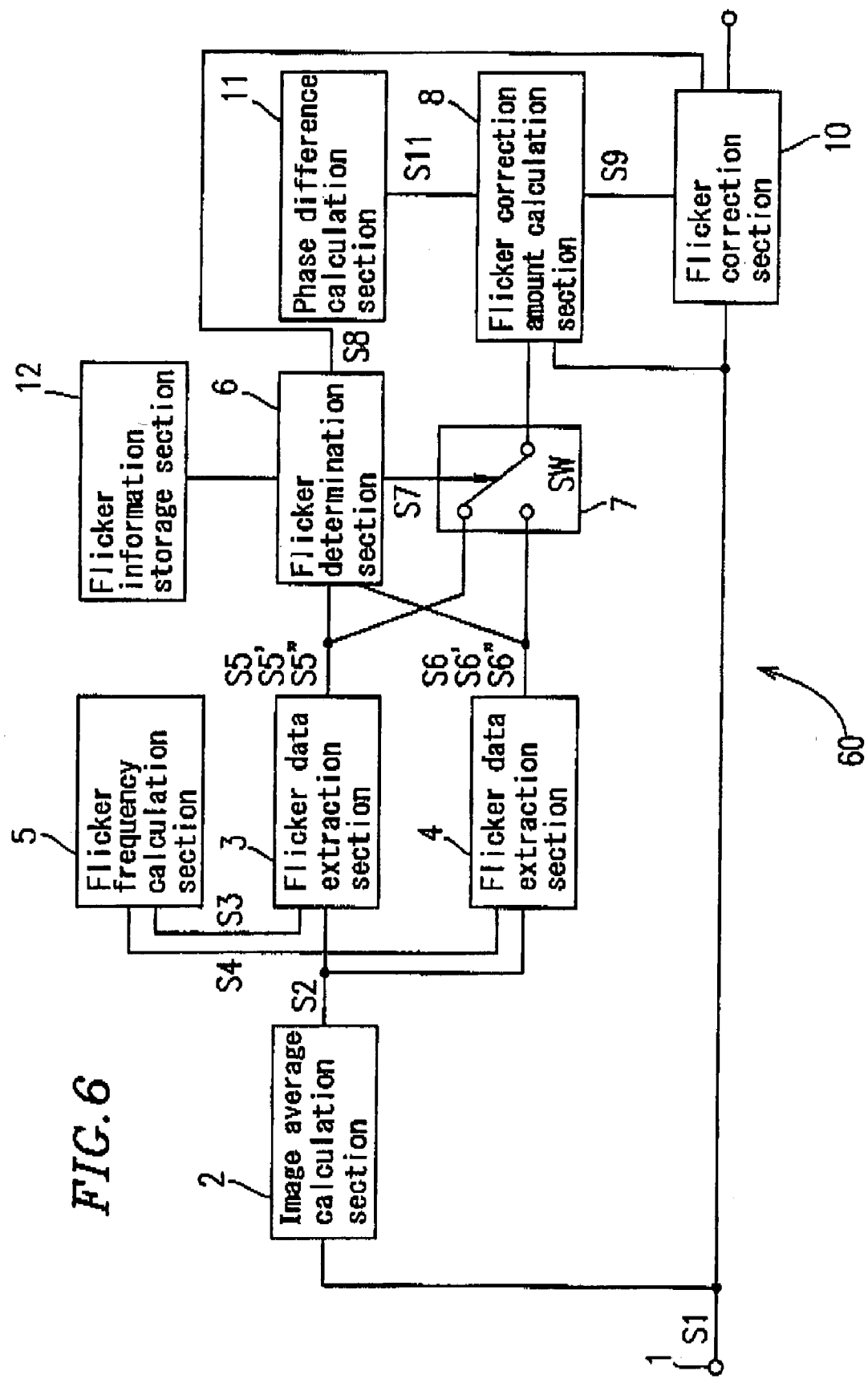
FIG. 6 is a schematic block diagram showing a configuration of a flicker correction apparatus according to Example 4 of the present invention.
Figure 7:
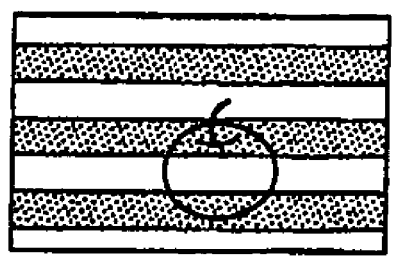
FIG. 7 is a schematic diagram showing an image in which a flicker phenomenon occurs.
Figure 8:
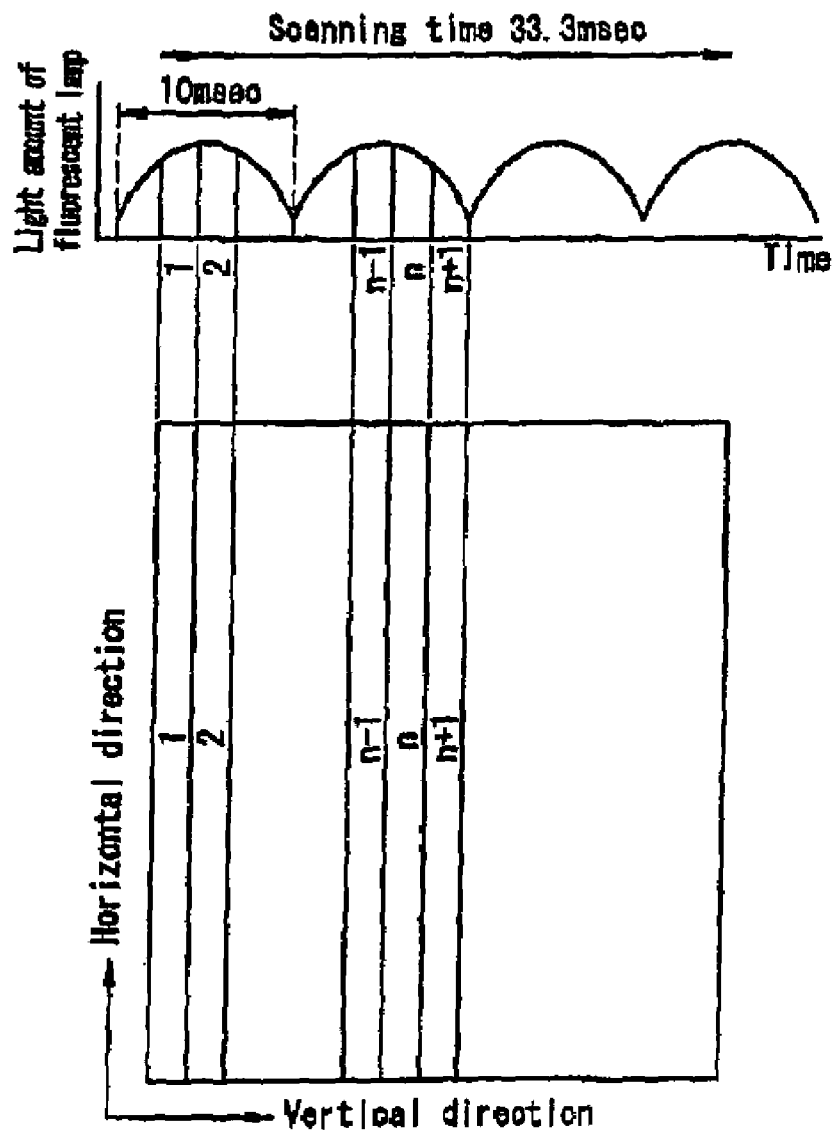
FIG. 8 is a diagram for explaining a principle of the occurrence of a flicker phenomenon.

FIG. 6 is schematic block diagram showing a configuration of a flicker correction apparatus 60 according to Example 4 of the present invention.

This flicker correction apparatus has a flicker information storage section 12 in addition to the flicker correction apparatus 50 of Example 3 (FIG. 5).

A single frame or field of image signal is used to determine the presence or absence of a flicker phenomenon and perform flicker correction, however, in this case, a detection error may occur.

A flicker phenomenon is present over a plurality of frames or fields. Therefore, in the flicker correction apparatus 60 of Example 4, the flicker information storage section 12 accumulates the results of determination of the presence or absence of a flicker phenomenon over a plurality of frames or fields. The flicker determination section 6 references past flicker information stored in the flicker information storage section 12. If a flicker phenomenon is present during a period of several frames or fields, flicker information S7 and S8 are generated and output to a SW 7 and a flicker correction section 10 so that flicker correction is performed.

The other portions of the configuration and the correction process of the flicker correction apparatus 60 of Example 4 are similar to those in Example 3, and the description thereof is omitted.

As described above in detail, according to the present invention, a flicker determination section can determine the presence or absence of a flicker phenomenon. Therefore, even when Illumination and an AC power source frequency are changed, a flicker can be appropriately corrected. Data corresponding to frames or fields having the same bright or dark stripe is not required as is different from conventional flicker correction apparatuses. Therefore, flicker correction can be rapidly performed irrespective of the frame or field frequency of an imaging device.

A flicker correction amount calculation section can calculate a flicker correction amount depending on the brightness of a pixel, and the flicker correction amount is used in flicker correction. Therefore, even if a dark region is present in one frame or field of image signal, flicker correction can be appropriately performed.

A flicker information storage section accumulates information on the presence or absence of a flicker in past frames or fields. A flicker determination section references such information. Therefore, flicker correction can be performed if a flicker phenomenon occurs during a period of several frames or fields, whereby error is reduced when determining whether or not correction of a flicker phenomenon is performed.

According to the present invention, a reduction in image quality due to a flicker phenomenon can be prevented in an image obtained by an electronic still camera, a PC camera, or the like, comprising an X-Y address scanning type solid-state imaging device under the illumination of a fluorescent lamp blinking in synchronization with an AC power source, thereby making it possible to display a high-quality image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A flicker correction apparatus for correcting a flicker component of an image signal obtained by imaging an object using an imaging device, the apparatus comprising:
   an image average calculation section for calculating an average of the image signal far each line or each group of lines in a horizontal or vertical direction;
   a flicker frequency calculation section for calculating a flicker frequency using an AC power source frequency and a frame or field frequency of the imaging device;
   a flicker data extraction section for extracting flicker data using the average of the image signal calculated by the image average calculation section and the flicker frequency calculated by the flicker frequency calculation section;
   a flicker determination section for determining the presence or absence of a flicker phenomenon using the flicker data;
   a flicker correction amount calculation section for calculating a flicker correction amount using the flicker data; and
   a flicker correction section for removing the flicker component of the image signal using the flicker correction amount calculated by the flicker correction amount calculation section and based on the determination by the flicker determination section.

2. The flicker correction apparatus according to claim 1, further comprising:
   an image memory for storing the image signal,
   wherein the flicker correction section removes the flicker component of the image signal stored in the image memory using the flicker correction amount calculated by the flicker correction amount calculation section.

3. The flicker correction apparatus according to claim 1, further comprising:
   a flicker phase difference calculation section for calculating a flicker phase difference, which is a phase difference between a flicker frequency of a past frame or field and a flicker frequency of a current frame or field, using the AC power source frequency and the frame or field frequency of the imaging device,
   wherein the flicker correction amount calculation section calculates a flicker correction amount using flicker data extracted from a past frame or field by the flicker data extraction section and the flicker phase difference calculated by the flicker phase difference calculation section, and
   the flicker correction section removes a flicker component of an image signal of a current frame or field using the flicker correction amount calculated by the flicker correction amount calculation section.

4. The flicker correction apparatus according to claim 1, wherein the flicker correction amount calculation section calculates the flicker correction amount depending on a brightness of a pixel to be corrected in one frame or field of the image signal.

5. The flicker correction apparatus according to claim 1, further comprising:
   a flicker information storage section for storing information relating to the presence or absence of a flicker phenomenon output from the flicker determination section,
   wherein the flicker determination section determines the presence or absence of a flicker phenomenon by referencing the information relating to the presence or absence of a past flicker phenomenon stored in the flicker information storage section.

6. The flicker correction apparatus according to claim 1, wherein:
   the flicker frequency calculation section calculates a first flicker frequency using a first AC power source frequency and the frame or field frequency of the imaging device, and calculates a second flicker frequency using a second AC power source frequency and the frame or field frequency of the imaging device;
   the flicker data extraction section comprises a first flicker data extraction sub-section for extracting first flicker data using the average of the image signal calculated by the image average calculation section and the first flicker frequency, and a second flicker data extraction sub-section for extracting second flicker data using the average of the image signal calculated by the image average calculation section and the second flicker frequency;
   the flicker determination section determines the presence or absence of a flicker phenomenon using the first and second flicker data; and
   the flicker correction amount calculation section calculates a flicker correction amount using the first or second flicker data based on the determination by the flicker determination section.

7. A flicker correction method for correcting a flicker component of an image signal obtained by imaging an object using an imaging device, the method comprising the steps of:

calculating an average of the image signal for each line or each group of lines in a horizontal or vertical direction;

calculating a flicker frequency using an AC power source frequency and a frame or field frequency of the imaging device;

extracting flicker data using the average of the image signal and the flicker frequency;

determining the presence or absence of a flicker phenomenon using the flicker data;

calculating a flicker correction amount using the flicker data; and removing the flicker component of the image signal using the flicker correction amount based on the determination of the presence or absence of a flicker phenomenon.

8. The flicker correction method according to claim 7, further comprising:

storing the image signal input from the imaging device, wherein the removing step comprises removing the flicker component of the stored image signal using the flicker correction amount.

9. The flicker correction method according to claim 7, further comprising:

calculating a flicker phase difference, which is a phase difference between a flicker frequency of a past frame or field and a flicker frequency of a current frame or field, using the AC power source frequency and a frame or field, frequency of the imaging device, wherein the flicker correction amount calculating step comprises calculating a flicker correction amount using flicker data of a past frame or field and the flicker phase difference, and the flicker component removing step comprises removing a flicker component of an image signal of a current frame or field using the flicker correction amount.

10. The flicker correction method according to claim 7, wherein:

the flicker frequency calculating step comprises calculating a first flicker frequency using a first AC power source frequency and the frame or field frequency of the imaging device, and calculating a second flicker frequency using a second AC power source frequency and the frame or field frequency of the imaging device;

the flicker data extracting step comprises extracting first flicker data using the average of the image signal and the first flicker frequency, and extracting second flicker data using the average of the image signal and the second flicker frequency;

the flicker phenomenon determining step comprises determining the presence or absence of a flicker phenomenon using the first and second flicker data; and the flicker correction amount calculating step comprises calculating a flicker correction amount using the first or second flicker data based on the determination of the presence or absence of a flicker phenomenon.

11. A computer program product comprising a recording medium having encoded thereon a computer readable program executable by a computer for correcting a flicker component of an image signal, obtained by imaging an object using an imaging device, by carrying out the steps of claim 7.

* * * * *